United States Patent [19]

Aharoni

[11] 4,349,503
[45] Sep. 14, 1982

[54] POLYESTER COMPOSITIONS CONTAINING SODIUM NITRITE

[75] Inventor: Shaul M. Aharoni, Morris Plains, N.J.

[73] Assignee: Allied Corporation, Morris Township, Morris County, N.J.

[21] Appl. No.: 263,662

[22] Filed: May 15, 1981

[51] Int. Cl.³ .......................... C08F 8/00; C08L 67/02
[52] U.S. Cl. ............................... 264/328.16; 528/272; 528/288; 264/328.18; 525/165; 524/605; 524/429; 524/513; 524/293; 524/314; 523/455; 523/400
[58] Field of Search .... 260/40 R, 31.2 XA, 31.8 XA; 525/165; 528/272, 288; 264/328.16, 328.18

[56] References Cited

U.S. PATENT DOCUMENTS

| | | |
|---|---|---|
| 3,435,093 | 3/1960 | Cope .................................. 260/357 |
| 3,516,957 | 6/1970 | Gray, Jr. et al. ...................... 260/22 |
| 3,639,527 | 2/1972 | Brinkman et al. ................... 260/873 |
| 4,212,791 | 7/1980 | Avery et al. ........................ 260/40 R |
| 4,220,735 | 9/1980 | Dieck et al. .......................... 525/90 |
| 4,257,929 | 3/1981 | Borman .............................. 260/40 R |

FOREIGN PATENT DOCUMENTS 7901605 2/1978 Netherlands .
7901609 2/1979 Netherlands .

Primary Examiner—Lucille M. Phynes
Attorney, Agent, or Firm—Richard A. Negin

[57] ABSTRACT

A composition and a method to crystallize the composition. The composition comprises a linear saturated polyester, preferably poly(ethylene terephthalate) and from 0.05 percent to 0.6 percent of sodium nitrite. The composition can contain a plasticizer, impact modifier and a filler.

28 Claims, No Drawings

POLYESTER COMPOSITIONS CONTAINING SODIUM NITRITE

DESCRIPTION

BACKGROUND OF THE INVENTION

1. Field of Invention

This invention relates to linear, saturated polyester compositions containing sodium nitrite as a nucleating agent.

2. Description of the Prior Art

It is known to use nucleating agents in crystallizable polymers such as linear saturated polyesters of aromatic dicarboxylic acids. U.S. Pat. Nos. 3,435,093; 3,516,957 and 3,639,527; as well as Dutch Patent Numbers NL 7901605, and NL 7901609, disclose various approaches to molding thermoplastic compositions of linear saturated polyesters of aromatic dicarboxylic acids, and are particularly applicable to poly(ethylene terephthalate). These patents generally disclose the use of salts of hydrocarbon and polymeric carboxylic acids as nucleating agents for linear saturated polyesters.

A molding formulation based on a linear saturated polyester such as poly(ethylene terephthalate) should result in molded product having good physical properties including flexural strength, modulus, tensile strength and impact properties. Further, the molding compound should also have good molding properties including a fast molding cycle, a high melt flow index for sufficient flow into the mold, good mold release properties and good finished appearance.

From a practical point of view, it is desirable that satisfactory properties as outlined above be attained using water heated molds. These molds are heated to temperatures between about 76.7° C. (170° F.) to about 100° C. (212° F.). In order to accomplish this it is desirable for crystallization to begin at as high a temperature as possible upon the cooling of the polyester which was fed into the mold. $T_{cc}$ is used as a measurement to determine the temperature at which crystals first appear upon cooling from the melt. $T_{cc}$ can be measured using a Differential Scanning Calorimeter by the procedure detailed below.

SUMMARY OF THE INVENTION

This invention relates to a composition comprising a linear, saturated polyester, such as poly(ethylene terephthalate), containing from about 0.05 percent to about 0.6 percent, preferably 0.1 percent to 0.5 percent, more preferably 0.2 percent to 0.5 percent, and most preferably 0.3 percent to 0.4 percent of sodium nitrite based on the weight of the poly(ethylene terephthalate). Preferably, the composition of the present invention contains from 2 percent to 10 percent, based on the weight of the poly(ethylene terephthalate), of a plasticizer, and from 2 percent to 6 percent, based on the weight of the poly(ethylene terephthalate), of an impact modifier. The composition can be filled with up to about 150 percent based on the weight of the poly(ethylene terephthalate), of filler.

The present invention is a polyester, such as a poly(ethylene terephthalate), composition which can be molded in water heated molds to relatively low temperatures and method of making a crystalline composition. To accomplish this the crystallization must begin at as high a temperature ($T_{cc}$) as possible. The composition of the present invention uses the inorganic sodium salt sodium nitrite. The sodium nitrite acts as a nucleating agent which can increase the temperature at which crystallization begins. This inorganic salt melts below the processing temperature at which the poly(ethylene terephthalate) composition is processed, and above the temperature at which crystallization is first measurable upon cooling.

Objects, features and advantages of the present invention will become apparent by reference to the following specification:

DESCRIPTION OF THE PREFERRED EMBODIMENTS

This invention relates to a composition comprising a mixture of a linear saturated polyester, preferably poly(ethylene terephthalate), and from about 0.05 percent to about 0.6 percent, preferably from 0.1 percent to 0.5 percent, more preferably from 0.2 percent to 0.5 percent, and most preferably from 0.3 percent to 0.4 percent based on the weight of the poly(ethylene terephthalate), of sodium nitrite. In the most preferred embodiment, the composition contains a plasticizer. Preferably the composition contains a filler such as fiberglass and an impact modifier. There can be up to about 150%, and preferrably 30% to 90% filler based on the weight of the poly(ethylene terephthalate). The preferred filler is fiberglass in the range of from 30% to 90% by weight based on the poly(ethylene terephthalate).

The composition of the present invention includes linear, saturated polyesters of aromatic dicarboxylic acids. The preferred linear saturated polyesters include poly(ethylene terephthalate), polybutylene terephthalate, and poly(1,4-cyclohexane dimethylene terephthalate, with poly(ethylene terephthalate) being most preferred due to the low molding temperatures possible. The poly(ethylene terephthalate) for use with the present invention has an intrinsic viscosity range between about 0.4 and about 1.00, with a preferred intrinsic viscosity range between about 0.45 and 0.6. Intrinsic viscosity is obtained by extrapolation of viscosity values to zero concentration of solutions of poly(ethylene terephthalate) in a 60 to 40 weight/volume ratio of phenol and tetrachloroethane. The measurements are normalized to 25° C. The poly(ethylene terephthalate) melts between about 250° C. and 275° C. The poly(ethylene terephthalate) can contain minor amounts, up to 5%, of other comonomers such as 1,4cyclohexyldimethyldiol, butyldiol, neopentyldiol, diethylene glycol, or glutaric acid.

Sodium nitrite is available as crystals, pellets, sticks or powder. It has a specific gravity of about 2.157 and a melting point of 271° C. The sodium nitrite is considered to be the nucleating agent of the composition of the present invention. Sodium nitrite can be added to the composition for melt blending in a suitable form. Preferably the sodium nitrite is in powder form. Sodium nitrite can be added to the composition coated on the surface of small particle size inert powders having a high surface to volume ratio. The use of the inert powder helps to reduce the amount of sodium nitrite, and more uniformly distribute the sodium nitrite in the poly(ethylene terephthalate). Representative examples of these inert powders include alumina, silica, aerogel, hydrogel and carbon black.

There is from about 0.05 percent to about 0.6 percent, preferably from 0.1 percent to 0.5 percent, more preferably from 0.2 percent to 0.5 percent, and most preferably from 0.3 percent to 0.4 percent based on the weight of the poly(ethylene terephthalate) of sodium nitrite. There is sufficient sodium nitrite for crystallization to being in the composition at a high enough temperature upon cooling from the melt, to be molded in water heated molds at temperatures from about 76° C. to about 100° C. This allows crystal formation in the poly(ethylene terephthalate) before the temperature decreases to below that which crystallization is expected.

The temperature at which crystal formation is first measurable is $T_{cc}$. $T_{cc}$ is measured by weighing about 7 milligrams of the sample. The sample is placed in a Differential Scanning Calorimeter and heated for 10° C./min. from room temperature at 300° C. It is held at 300° C. for 5 minutes. The sample is then cooled at 10° C./min. The $T_{cc}$ appears as a sharp peak on the cooling branch of the curve.

The $T_{cc}$ for pure poly(ethylene terephthalate) having an intrinsic viscosity of 0.56 is approximately 190° C. It is desirable for cystallization from the melt to begin at as high a temperature as possible without adversely affecting the properties of the molded composition. Preferably, there is sufficient sodium nitrite for the composition to have a $T_{cc}$ of at least about 210° C.

Any suitable filler can be used in the composition of the present invention. The fillers may optionally be treated with various coupling agents or adhesion promotors as is known to those skilled in the art. Such fillers may be selected from a wide variety of minerals, metals, metal oxides, siliceous materials, metal salts, and materials thereof. Examples of fillers include glass fibers, alumina, feldspar, asbestos, talc, calcium carbonates, clay, carbon black, quartz, novaculite and other forms of silica, kaolinite, bentonite, garnet, mica, saponite, beidellite, etc. The foregoing recited fillers are illustrative only and are not meant to limit the scope of the fillers that can be utilized in this invention. There is up to 150 percent by weight of the poly(ethylene terephthalate) of filler, and preferably about 30 percent to about 90 percent by weight of the poly(ethylene terephthalate) of filler. The most preferred filler is glass fibers.

It is preferred to use a plasticizer in the composition of the present invention. The plasticizer allows crystallization of amorphous areas of the poly(ethylene terephthalate) to continue to crystallize at lower temperatures than if a plasticizer is not used. This is particularly important in low temperature molding where the mold temperature is below the temperature at which crystallization is expected to stop. This temperature for pure poly(ethylene terephthalate) is about 125° C. (257° F.). It has been found in copending application Ser. No. 219,088, Poly(ethylene terephthate) Composition Containing Aliphatic Plasticizer and Nucleating Agent, filed Dec. 21, 1980, that about 4 percent of dioctyl adipate plasticizer can reduce the temperature at which an amorphous piece of polyethylene terephthalate having an intrinsic viscosity of 0.6 can crystallize to as low as 102° C.

The plasticizers which can be used with the composition of the present invention are of the type known in the art which can be used with linear saturated polyester molding compositions preferably poly(ethylene terephthalate). A nonlimiting group of plasticizers which can be used are found in Dutch Patents NL7901605 and NL7901609. The plasticizers disclosed are organic esters. The organic esters can be the product of an aromatic carboxylic acid of 7-11 carbon atoms containing at least one carboxyl group per aromatic nucleus, and an alcohol selected from those of the formula $(HOCH_2)_xR^1$ wherein x is 1, 2 or 3 and $R^1$ is a hydrocarbon radical of 2-15 carbon atoms (preferably 2-10 carbon atoms) or those of the formula HO-(R"O)R''' wherein y is a cardinal number between 1 and 15, and preferably between 1 and 8, R" is a hydrocarbon radical of 2-15 carbon atoms, preferably 2-8 carbon atoms, and R''' is -H or a hydrocarbon radical of 2-20 carbon atoms, preferably 2-12 carbon atoms. The plasticizer disclosed can also be the product of an aliphatic carboxylic acid of 1 to 20 carbon atoms containing 1-3 carboxyl groups, and an alcohol of the formula HO(R"O)yR''', wherein R", R" and y are defined above Further the plasticizers disclosed include the following organic kelones of the formula

organic sulfones of the formula RSOOR; organic sulfoxides of the formula $R_2SO$; organic nitriles of the formules RCN; and organic amides of the formula

wherein R is a hydrocarbon radical group of 1-25 carbons, and $R^1$ is a hydrogen or hydrocarbon radical group of 1-25 carbon atoms. A preferred aliphatic plasticizer is dioctyl adipate, and a preferred aromatic plasticizer is neopentyl glycol dibenzoate. Other aromatic plasticizers which can be used include: triethylene glycol dibenzoate, glyceryl tribenzoate, trimethylolethane tribenzonte, and pentaerythritol tetrabenzoate. In the present invention up to about 15 percent by weight of the polyester of plasticizer can be used. Preferably, there is between about 2 percent and 10 percent based on the weight of the poly(ethylene terephthalate) of plasticizer, and most preferably there is between about 2 percent and about 6 percent based on the weight of the poly(ethylene terephthalate) of plasticizer.

Preferably, copolymers of ethylene and carboxylic acids or their esters can be used as impact modifiers. Included in these impact modifiers are the following copolymers: ethylene acrylic acid methylene acrylic acid, ethylene ethyl acrylate, ethylene vinyl acetate, and mixtures thereof. There can be up to about 10 percent based on the weight, and preferably from about 2 percent and about 6 percent based on the weight of the poly(ethylene terephthlate) of the impact modifier.

The composition can contain a polyepoxide. The epoxy resins which can be used include as an epoxy formed from bisphenol-A and glycidyl ester, or polyepoxides obtained by reacting orthocresol novolac and epichlorohydrin. Preferred polyepoxides are epoxy cresol novolac resins produced by Ciba-Geigy Corporation, and include ECN ®, 1235, 1273 and 1299. Preferably, there is up to about 3 percent, and more preferably 0.1 percent to about 0.5 percent, based on the weight of the poly(ethylene terephthalate) of polyepoxide. The polyepoxides act as chain extenders and help to compensate for poly(ethylene terephthalate) chains broken by hydrolysis.

In addition to the components discussed above, the compositions of the present invention can contain additives commonly employed with polyester resins, such as colorants, mold release agents, antioxidants, ultraviolet light stabilizers and the like.

A preferred filled composition comprises poly(ethylene terephthalate), from about 30 percent to about 60 percent glass fibers, and from about 0.3 percent to about 0.4 percent sodium nitrite. There can be from 3 percent to 6 percent of a plasticizer such as neopentyl glycol dibenzoate, from 2 percent to 4 percent of ethylene acrylic acid copolymer, and from 0.1 to 0.6 percent polyepoxide. The percents are based on the weight of poly(ethylene terephthalate).

The polyester, preferably poly(ethylene terephthalate), composition of the present invention is blended at temperatures above the melting point of the sodium nitrite which is 271° C., and above the melting point of the polyester. Preferably, the composition of the present invention is melt blended at temperatures from 275° C. to 325° C., and preferably from 275° C. to 300° C. By processing at these temperatures the sodium nitrite can be uniformly melt blended into the polyester composition. Upon cooling the sodium nitrite freezes into its solid form and is uniformly distributed in the polyester melt at a temperature higher than that at which the cooling polyester, preferably, poly(ethylene terephthalate), begins to crystallize. As the melt continues to cool polyster G crystallization begins at the solid sodium nitrite nucleation sites. The uniformly distributed, fine sodium nitrite particles enable the temperature (Tcc) at which crystallization is first measurable to increase. Preferably, the sodium nitrite can be coated on small particle size inert powders. This helps to increases the uniformity of the sodium nitrite distribution in the blend, and results in less sodium nitrite required than if it is added to the composition in powder form.

The above described method of forming a crystalline polyester composition is particularly useful in forming and molding the polyester. A preferred molding method is injection molding. Here the composition can be melt blended in an extruder and injected into a mold. The temperature condition of the melt blending are discussed above. The mold can be water cooled to as low as 76.7° C. to up about 100° C. A warmer mold temperature allows crystallization to continue for a longer period of time. Of course, the molding cycle is also longer with a warmer mold.

Several examples are set forth to illustrate the nature of the invention and the manner of carrying it out. However, the invention should not be considered as being limited to the details thereof.

EXAMPLES 1-4

In the following examples, 500 grams of poly(ethylene terephthalate) having an intrinsic viscosity of 0.95 was melt blended in a 1 inch single screw extruder at about 275° C. to 280° C. with sodium nitrite. The sodium nitrite was ground powder having a melting point of 271° C. The Tcc's and intrinsic viscosities (IV) of the example compositions are summarized below. The percent sodium nitrite is based on the weight of the poly(ethylene terephthalate).

|  | % NaNO$_2$ | wt NaNO$_2$(g) | PET IV | Tcc °C. |
| --- | --- | --- | --- | --- |
| Ex. 1 | 0.2 | 1 | 0.63 | 210 |
| Ex. 2 | 0.3 | 1.5 | 0.60 | 213 |
| Ex. 3 | 0.4 | 2 | 0.58 | 215 |

-continued

|  | % NaNO$_2$ | wt NaNO$_2$(g) | PET IV | Tcc °C. |
| --- | --- | --- | --- | --- |
| Ex. 4 | 0.5 | 2.5 | 0.50 | 208 |

EXAMPLES 5,6

Examples 5 and 6 illustrate the effect on Tcc of the addition of ethylene acrylic acid. Dow Chemical Corp. DOW EAA 455 having 8 percent by weight of acrylic acid was used. The same type of poly(ethylene terephthalate), sodium nitrite, and procedure were used as in Examples 1-4. As in Examples 1-4, 500 grams of poly(ethylene terephthalate) was used. The percents listed are percents based on the weight of the poly(ethylene terephthalate).

|  | % NaNO$_2$ | % EAA | Tcc °C. |
| --- | --- | --- | --- |
| Ex. 5 | .35 | — | 208 |
| Ex. 6 | .35 | 6 | 210 |

EXAMPLES 7-11

The following summarizes examples of preferred filled compositions of the present invention. The parts are percents based on 100 parts of poly(ethylene terephthalate). The poly(ethylene terephthalate) has an intrinsic viscosity of 0.75. The fiberglass is ⅛" glass fibers. The ethylene acrylic acid is described in Example 6. The plasticizers are neopentyl glycol dibenzoate and dioctyl adipate. The epoxy used is the reaction product of orthocresol novolac and epichlorohydrin, ECN 1273 manufactured by Ciba-Geigy. The ethylene ethyl acrylate is Union Carbide Corporation Bakelite TM flexible ethylene copolymer DPD 6169 described as having a melt index of 6 g/10 min and an ethyl acrylate content of 18 weight percent. A small amount of sodium stearate is added to help mold release.

EXAMPLES 7-11

|  | Ex. 7 | Ex. 8 | Ex. 9 | Ex. 10 | Ex. 11 |
| --- | --- | --- | --- | --- | --- |
| Fiberglass | 45 | 45 | 45 | 45 | 45 |
| EAA | 4 | — | 4 | 4 | 4 |
| EEA | — | 4 | — | — | — |
| Neopentyl Glycol Dibenzoate | 5 | 5 | 5 | 5 | — |
| Dioctyl Adipate | — | — | — | — | 4 |
| Epoxy | .4 | .4 | .4 | .4 | .4 |
| Sodium Stearate | — | — | .5 | — | — |
| NaNO$_2$ | .3 | .3 | .3 | .4 | .3 |

While exemplary embodiments of the invention have been described, the true scope of the invention is to be determined from the following claims.

What is claimed is:

1. A composition comprising:
a linear saturated polyester;
from about 0.05 to about 0.6 percent based on the weight of the polyester of sodium nitrite.
2. The composition as recited in claim 1 wherein the linear saturated polyester is poly(ethylene terephthalate).

3. The composition as recited in claim 2 wherein there is from 0.1 percent to 0.5 percent based on the weight of the poly(ethylene terephthalate) of sodium nitrite.

4. The composition as recited in claim 3 wherein there is from 0.2 percent to 0.5 percent based on the weight of the poly(ethylene terephthalate) of sodium nitrite.

5. The composition as recited in claim 4 wherein there is from 0.3 percent to 0.4 percent based on the weight of the poly(ethylene terephthalate) of sodium nitrite.

6. The composition as recited in claim 2 wherein there is sufficient sodium nitrite for the composition to have a Tcc of at least about 210° C.

7. The composition as recited in claims 2 or 5 further comprising up to 150 percent based on the poly(ethylene terephthalate) of a filler.

8. The composition as recited in claim 7 wherein there is from 30 percent to 90 percent filler based on the poly(ethylene terephthalate).

9. The composition as recited in claim 8 wherein the filler is glass fiber.

10. The composition as recited in claim 2 or 5 further comprising up to about 15 percent based on the weight of the poly(ethylene terephthalate) of plasticizer.

11. The composition as recited in claim 10 comprising from about 2 percent to about 10 percent based on the weight of the poly(ethylene terephthalate) of plasticizer.

12. The composition as recited in claim 11 comprising from about 2 percent to 6 percent based on the weight of poly(ethylene terephthalate) of plasticizer.

13. The composition as recited in claim 11 wherein the plasticizer is selected from the group consisting of: dioctyl adipate, neopentyl glycol dibenzoate, triethylene glycol dibenzoate, trimethylolethane tribenzoate, and pentaerythritol tetrabenzoate.

14. The composition as recited in claims 2 or 5 comprising up to 10 percent based on the poly(ethylene terephthalate) of an impact modifier.

15. The composition as recited in claim 14 wherein there is from about 2 percent to about 6 percent of an impact modifier selected from the group consisting of: ethylene acrylic acid copolymer, ethylene methacrylic acid copolymer, ethylene ethylacrylate, ethylene vinyl acetate or a mixture of thereof.

16. The composition as recited in claims 2 or 5 further comprising up to 3 percent based on the weight of poly(ethylene terephthalate) of epoxy.

17. The composition as recited in claim 15 wherein there is from 0.1 percent to 0.5 percent based on the weight of the poly(ethylene terephthalate) of epoxy.

18. A composition comprising:
poly(ethylene terephthalate);
from about 0.2 percent to about 0.5 percent based on the weight of the poly(ethylene terephthalate) of sodium nitrite;
from about 2 percent to about 6 percent of a plasticizer; and
from about 0.1 percent to about 0.5 percent of epoxy.

19. The composition as recited in claim 18 wherein the plasticizer is selected from the group consisting of: dioctyl adipate, neopentyl glycol dibenzoate, triethylene glycol dibenzoate, trimethylolethylene tribenzoate, and pentaerythritol tetrabenzoate.

20. The composition as recited in claim 18 further comprising from 30 percent to 90 percent based on the weight of the poly(ethylene terephthalate) of a filler.

21. The composition as recited in claim 20 wherein the filler is fiberglass.

22. The composition as recited in claim 20 comprising up to 10 percent based on the poly(ethylene terephthalate) of an impact modifier.

23. The composition as recited in claim 22 wherein there is from about 2 percent to about 6 percent of an impact modifier selected from the group consisting of: ethylene acrylic acid copolymer, ethylene methacrylic acid copolymer, ethylene ethyle acrylate, ethylene vinyl acetate; and mixtures thereof.

24. A method of making a crystalline polyester composition comprising the steps of: melt blending polyester and sodium nitrite in a temperature range greater than the melting point of sodium nitrite, which is 271° C., and above the melting point of the polyester, and lower than about 325° C.; cooling the melt blend to below the temperature (Tcc) at which crystallization of the polyester in the blend begins; and nucleating the polyester crystals with the sodium nitrite.

25. The method as recited in claim 24 wherein the sodium nitrite is coated on small particle size powders prior to melt blending.

26. The method as recited in claim 24 wherein the polyester is poly(ethylene terphthalate).

27. The method as recited in claim 26 wherein the melt blending temperature range is from 275° C. to 300° C.

28. The method as recited in claim 24 further comprising the step of injection molding the melt blend in a mold water cooled to from 76.7° C. to 100° C., wherein the cooling and nucleating steps take place.

* * * * *

UNITED STATES PATENT AND TRADEMARK OFFICE
CERTIFICATE OF CORRECTION

PATENT NO. : 4,349,503
DATED : September 14, 1982
INVENTOR(S) : Shaul M. Aharoni It is certified that error appears in the above-identified patent and that said Letters Patent are hereby corrected as shown below:

Column 8, line 22, "claim 20" should read --claim 18--

Signed and Sealed this

Third Day of May 1983

[SEAL]

Attest:

GERALD J. MOSSINGHOFF

Attesting Officer

Commissioner of Patents and Trademarks